(12) United States Patent
Tanaka

(10) Patent No.: US 6,230,999 B1
(45) Date of Patent: May 15, 2001

(54) PAPER MAGAZINE CORE

(75) Inventor: Tetsuya Tanaka, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/332,947

(22) Filed: Jun. 15, 1999

(30) Foreign Application Priority Data

Jun. 15, 1998 (JP) .................................. 10-167013

(51) Int. Cl.$^7$ ............................ B65H 75/14; B65H 75/24
(52) U.S. Cl. .................................. 242/578.2; 242/608.4; 242/609.2; 242/611; 242/614; 242/559.4
(58) Field of Search .............................. 242/578.2, 578, 242/578.1, 608.4, 609.1, 609.2, 609.3, 611.1, 611, 614, 559.4

(56) References Cited

U.S. PATENT DOCUMENTS

| | | | |
|---|---|---|---|
| 1,948,430 | * 2/1934 | Robinson | 242/608.4 |
| 2,705,112 | * 3/1955 | Baumgarther | 242/599.4 |
| 3,224,702 | * 12/1965 | Jones et al. | 242/599.4 |
| 3,329,367 | * 7/1967 | Paradiso | 242/609.3 |
| 3,516,342 | * 6/1970 | Juescher | 242/578.2 |
| 4,129,266 | * 12/1978 | Masiello | 242/578.2 |
| 4,358,064 | * 11/1982 | Garneau | 242/578.2 |
| 5,551,647 | * 9/1996 | Browning | 242/578.2 |
| 5,651,511 | * 7/1997 | Crowley et al. | 242/557 |
| 5,911,382 | * 6/1999 | Wilson | 242/578.2 |

FOREIGN PATENT DOCUMENTS

540886 * 1/1932 (DE) ............................ 242/578.2

* cited by examiner

Primary Examiner—John M. Jillions
(74) Attorney, Agent, or Firm—Sughrue, Mion, Zinn, Macpeak & Seas, PLLC

(57) ABSTRACT

A paper magazine core for rotatably supporting a roll of photosensitive material in a paper magazine includes an inner core divided into two inner core members that can be screwed together. The surface of each inner core member is provided with rows of screw holes formed at prescribed spacing conforming with the widths of rolls of photosensitive material of various types. Flange members are screw-fastened at the screw holes whose locations are appropriate for the size of the photosensitive material to be used. Each flange member is formed with an insert portion having multiple steps insertable into paper tubes of different sizes. Non-slip portions are formed around the insert portions and surfaces of the steps. Once the flange members have been fastened on the inner core members in a light room, a roll of photosensitive material can be installed on the core in a dark room merely by joining the inner core members.

5 Claims, 11 Drawing Sheets

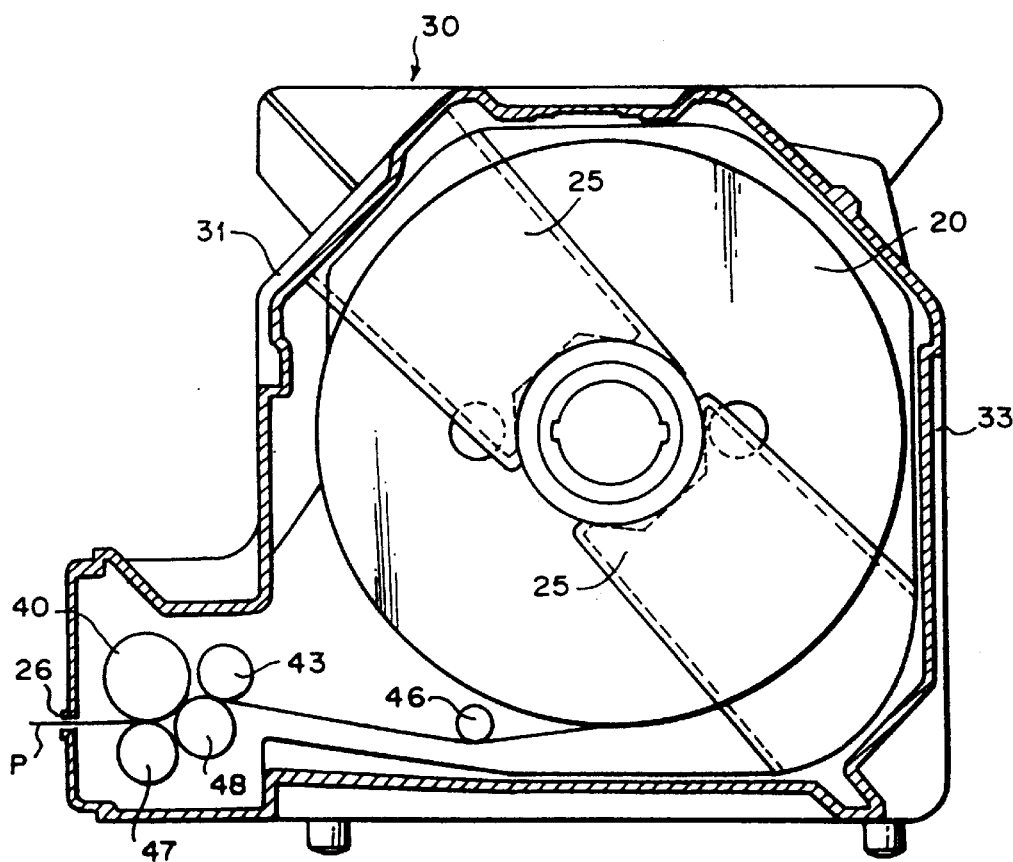
F I G. 7

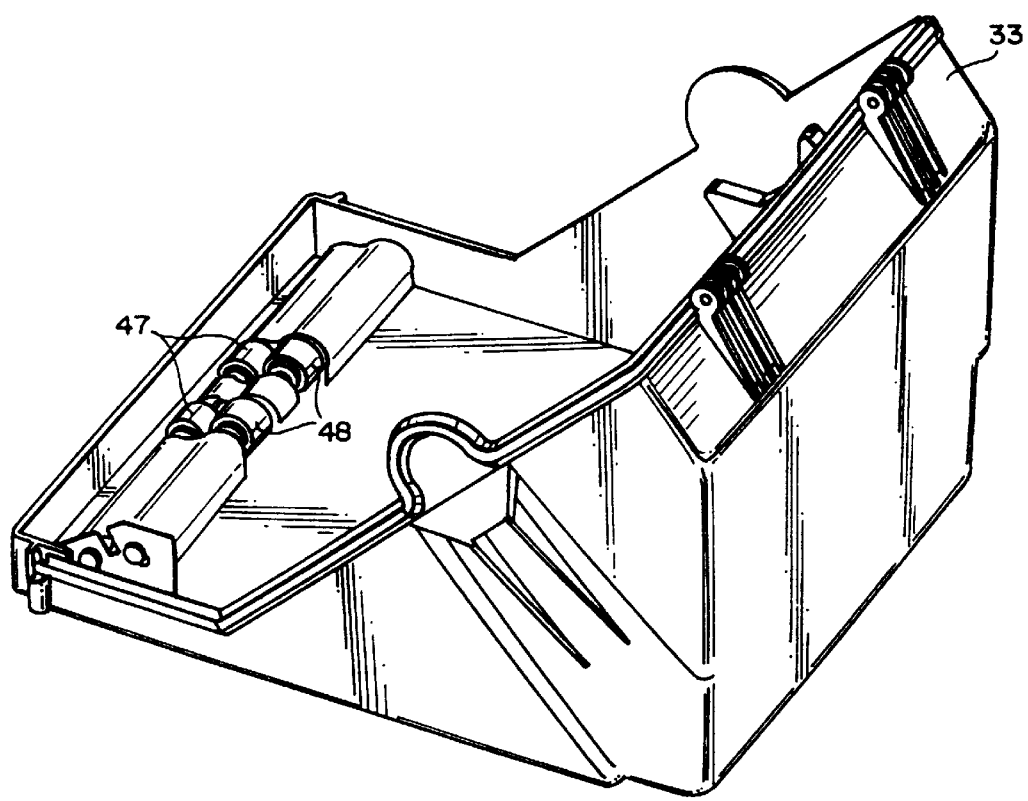
F I G. 8

PAPER MAGAZINE CORE

BACKGROUND OF THE INVENTION

1. Field of the Invention

The present invention relates to a paper magazine core for rotatably supporting a roll of photosensitive material in a paper magazine for guiding and feeding a photosensitive material to a printer or other processing apparatus.

2. Description of the Related Art

A printer for printing images from negative film onto photographic paper or other such photosensitive material is loaded with a paper magazine containing a roll of photosensitive material wound on a paper tube. The photosensitive material is drawn out of the paper magazine and conveyed to the printer during printing of images on the photosensitive material. After printing, the printed photosensitive material is sent from the printer to a developer for development.

This roll-type photosensitive material is, in a darkroom or the like, first fitted on a core and then loaded into the paper magazine together with the core. The core has an inner core that is inserted into the paper tube and a pair of flange members that restrain the end faces of the photosensitive material to prevent the roll of photosensitive material from moving laterally (in the widthwise direction of the material) along the inner core. Once the inner core has been inserted into the paper tube of the photosensitive material roll and the roll has been positioned laterally by the flange members, the photosensitive material is loaded into the paper magazine. Photosensitive materials come in various widths (frequently referred to as sizes in this specification), two typical sizes being 102 mm and 254 mm. Moreover, size standards may differ between different countries. The flange members of the core are therefore made movable in the longitudinal direction of the inner core so that they can position the photosensitive material roll laterally according to its size. The structure of a conventional core is illustrated in FIG. 10. As shown in FIG. 10, an inner core 71 is formed from both ends toward the center with multiple grooves 74, 75. The grooves 74, 75 are formed at locations matched to the different sizes of photosensitive material that may be used. Each groove 74 is paired with a groove 75 and the members of each pair are laterally symmetrical with respect to the line X bisecting the inner core 71. Marks are affixed near the grooves 74, 75 so the user can quickly see how they are paired. Flange members 72, 73 are fastened at the pair of grooves 74, 75 matched to the size of the photosensitive material used.

As shown in FIG. 11, each of the flange members 72, 73 has two half-disk-shaped members 76, 77 that are separably joined into a disk-shaped member via tension springs 78 and guide members 79. The flange member 72 (73) is formed at its center with a hole portion 80 for insertion of the inner core 71. The inner surface of the hole portion 80 is formed with ridge portions 81 for engagement with the grooves 74, 75 of the inner core 71. To fasten the flange member 72 (73) to the inner core 71, the user draws the half-disk-shaped members 76, 77 apart against the force of the springs 78 to enlarge the hole portion 80 (see FIG. 11), inserts the inner core 71 into the expanded hole portion 80, brings it to the position of the desired groove 74 (75), and allows the half-disk-shaped members 76, 77 to return to their original joined condition. At this time, the ridge portions 81 of the hole portion 80 engage the desired groove 74 (75) to prevent the flange member 72 (73) from moving in the axial direction of the inner core 71. The roll of photosensitive material can therefore be positioned laterally (widthwise).

Two or more wedge-shaped portions 82 are attached at spaced locations around the center portion of the inner core 71 to extend parallel to the major axis of the inner core 71. The wedge-shaped portions 82 project radially outward from the inner core 71 somewhat beyond the portions forming the grooves 74, 75 of the inner core 71. The wedge-shaped portions 82 bite into the paper tube of the photosensitive material roll when the inner core 71 is inserted into the paper tube. This prevents the photosensitive material roll from rotating relative to the inner core 71. Another arrangement for preventing rotation of the photosensitive material roll commonly used instead of the wedge-shaped portions 82 consists of radially biased projecting members provided on the inner core 71 to thrust against the paper tube and hold it in place.

A photosensitive material roll is installed on this type of core as follows. First, the flange member 72 is engaged with the groove 74 appropriate for the size of the photosensitive material to be installed. Next, in a darkroom, the inner core 71 is inserted into the paper tube of the photosensitive material roll until the flange member 72 comes in contact with one end face of the photosensitive material roll. The hole portion 80 of flange member 73 is then expanded and fit over the inner core 71. When the flange member 73 makes contact with the other end face of the photosensitive material roll, its hole portion 80 is allowed to contract so that the flange member 73 is fixed at the position of the desired groove 75. The core with the fitted photosensitive material roll is then loaded in the paper magazine.

Thus, the forming of the inner core with grooves at spacings matched to the different photosensitive material sizes makes it possible to position the flange members at desired locations. But photosensitive materials come in many different sizes, some of which differ only very slightly, by as little as one or so millimeters. An attempt to form grooves compatible with all of the many photosensitive material sizes would therefore run into trouble because the grooves would have to be formed at such very fine spacing that they would interfere with each other. While this problem might be overcome by stocking multiple inner cores with differently spaced groove sets, this would increase the number of components required and lead to higher equipment manufacturing cost. In addition, the conventional core is structurally complicated because, as pointed out in the foregoing, the flange members have to be formed of half-disk-shaped members held together by tension springs.

Another problem is that, owing to the need to fit the photosensitive material roll on the core in a darkroom, the attachment of the remaining flange member has to be done by feel. The remaining flange member may therefore be mistakenly fastened at a groove position different from the desired one. When this happens, the positioning of the photosensitive material roll in the lateral direction cannot be effected reliably and the photosensitive material is liable to weave from side to side during feeding.

Moreover, the fact that the size of the paper tube of the photosensitive material roll also differs variously among different types of photosensitive material means that inner cores of different sizes have to be stocked in order to use photosensitive materials with different paper tube sizes. This increases the number of components required and leads to higher equipment manufacturing cost.

The present invention was accomplished in light of the foregoing circumstances. A first object of the present invention is to provide a core that can be fabricated simply at low cost.

A second object of the present invention is to provide a core that enables a roll of photosensitive material to be reliably positioned in the lateral (widthwise) direction even when the operation is conducted in a darkroom.

SUMMARY OF THE INVENTION

In a first aspect of the present invention, there is provided a paper magazine core for rotatably supporting a roll of photosensitive material in a paper magazine comprising:

an inner core for insertion into a paper tube wound with a roll of photosensitive material, a pair of flange members for positionally restraining a roll of photosensitive material installed on the inner core in its widthwise direction by abutting on opposite end faces of the roll of photosensitive material, positioning sections for locating the flange members at positions on the inner core conforming with the width of the roll of photosensitive material, each positioning section having multiple hole portions formed in the surface of the inner core at prescribed spacing conforming with the widths of rolls of photosensitive material of various types, and fastening portions engageable with the hole portions for fastening the flange members at desired positions.

Preferably in the first aspect of present invention, the inner core is divided longitudinally into multiple inner core members capable of attachment and detachment and the flange members are provided on different inner core members.

Each flange member preferably has an insert portion for insertion into the paper tube and the insert portion is preferably formed step-like with raised cylindrical portions of different diameters matched to paper tubes of different sizes.

In this case, portions of the insert portion abutting on an end face of the paper tube are preferably formed with non-slip portions.

In a second aspect of the present invention, there is provided a paper magazine core of the foregoing type, wherein each flange member has insert portions for insertion into the paper tube and the insert portions are formed step-like with raised cylindrical portions of different diameters matched to paper tubes of different sizes.

In the second aspect of present invention, portions of insert portions abutting on an end face of the paper tube are preferably formed with non-slip portions.

In a third aspect of the present invention, there is provided a paper magazine core of the foregoing type, wherein the inner core is divided longitudinally into multiple inner core members capable of attachment and detachment and the flange members are provided on different inner core members.

Since the present invention utilizes sections formed with holes instead of the conventional sections formed with groves as the means for positioning the flange members on the inner core, proper positioning of photosensitive materials that differ in size by only one to a few millimeters is therefore possible because interference between closely laterally spaced screw holes can be avoided by staggering the screw holes in the circumferential direction of the inner core. As this enables the flange members to be positioned to enable installation of photosensitive material rolls of various sizes on a single inner core, it reduces the number of constituent components and lowers equipment cost.

Since the inner core is divided longitudinally into multiple inner core members and the flange members are provided on different inner core members, the flange members can be fastened at the screw holes whose locations are appropriate for the size of the photosensitive material, beforehand in a light room, and a roll of photosensitive material can then be installed on the core by inserting one of the inner core members into the paper tube of the roll of photosensitive material, inserting the other inner core members into the paper tube, and fastening the inner core members together. Therefore, since the flange members can be fastened at the desired hole locations in a light room beforehand, the danger of fastening the flange members at wrong positions can therefore be eliminated. As this ensures that the photosensitive material is reliably positioned in its lateral (widthwise) direction by the flange members, weaving of the photosensitive material can be prevented. Moreover, since the only operation that need be conducted in a darkroom is the joining of the inner core members, the installation of the roll of photosensitive material on the core can be conducted with ease.

Each flange member is provided with at least one insert portion formed step-like with raised cylindrical portions of different diameters matched to paper tubes of different sizes. When a roll of photosensitive material is installed on the core of the present invention, therefore, raised portions matching the size of the paper tube into which the insert portions are inserted fit into the paper tube to positionally restrain the paper tube in the radial direction. As no need therefore arises for stocking inner cores of different sizes matched to different sized paper tubes, the number of constituent components can be reduced and equipment cost lowered.

In addition, the non-slip portions provided on regions of the insert portion abutting on the end faces of the paper tube inhibit rotation of the photosensitive material relative to the core.

BRIEF DESCRIPTION OF THE DRAWINGS

FIG. 7 is a sectional view of the paper magazine loaded with a core according to the first embodiment, FIG. 8 is a diagram showing the structure of a paper magazine cover unit.

DESCRIPTION OF THE PREFERRED EMBODIMENTS

Embodiments of the invention will now be explained with reference to the drawings.

Figure 1:
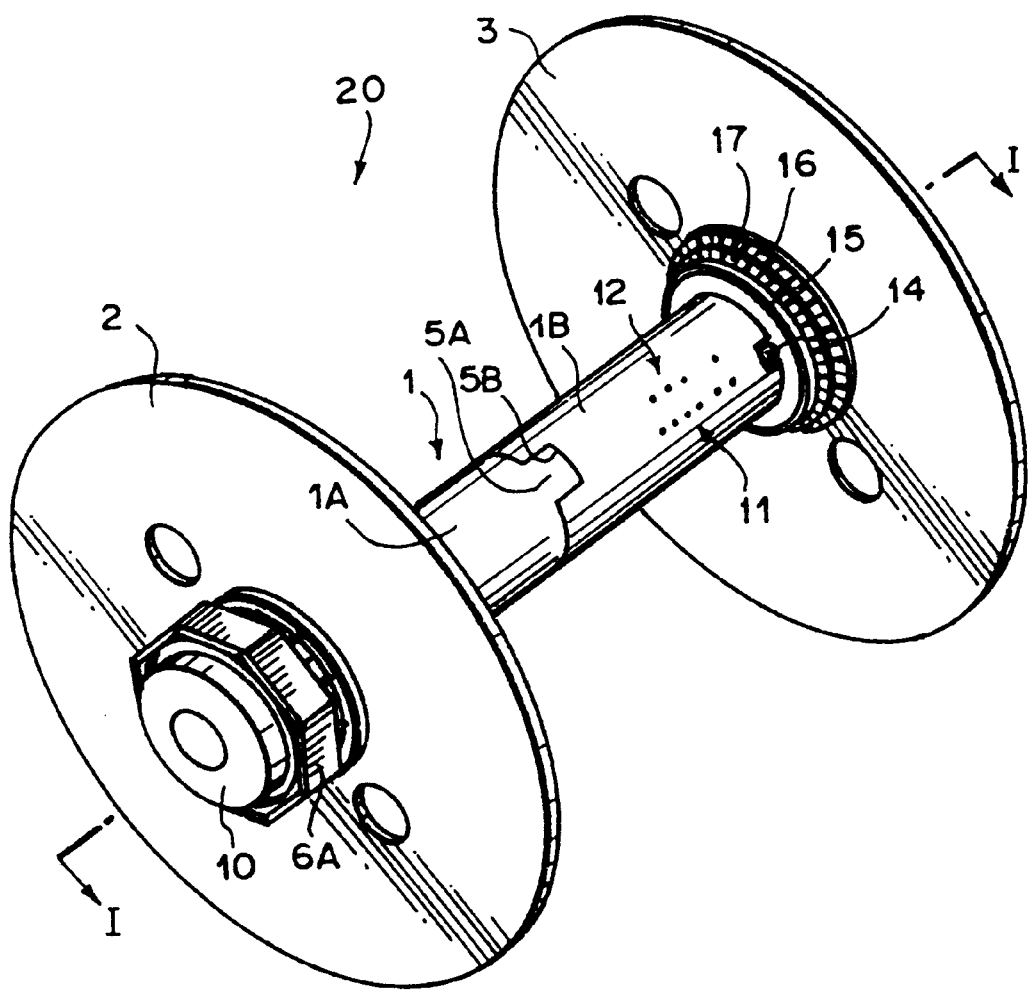
FIG. 1 is a perspective view showing the structure of a core that is a first embodiment of the present invention.
Figure 2:
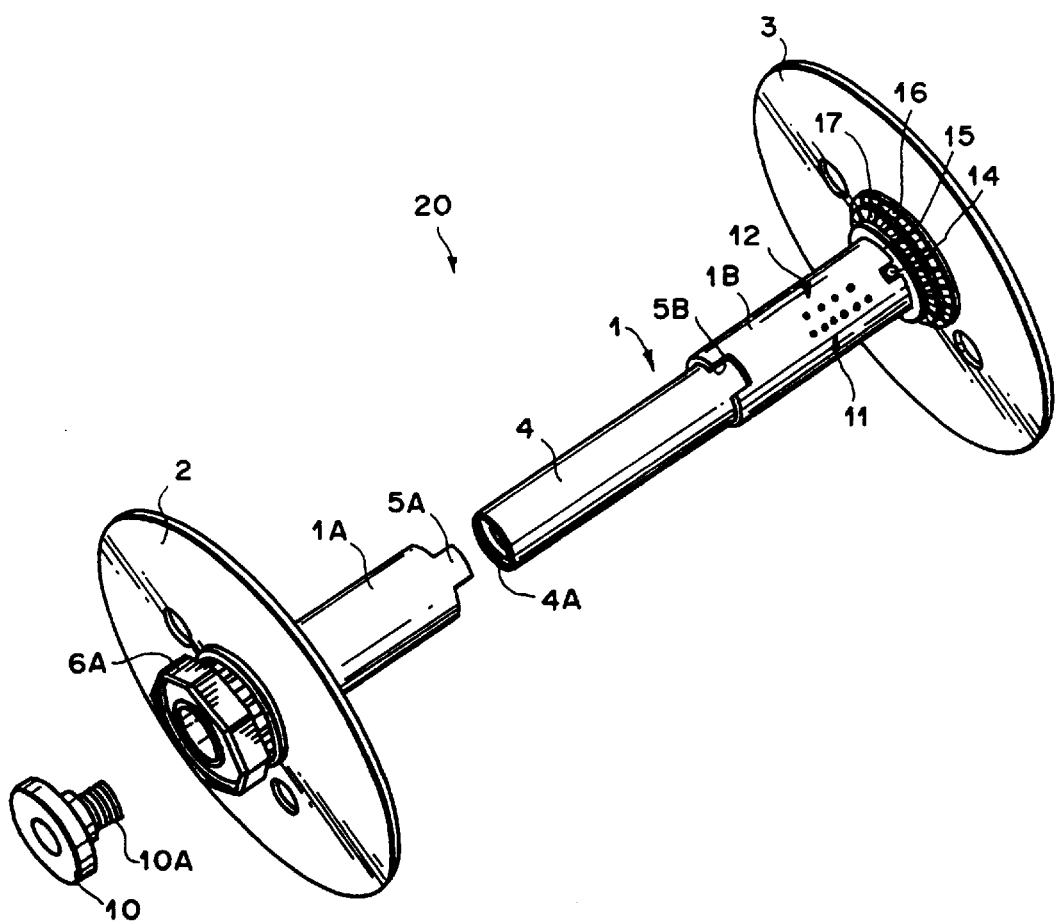
FIG. 2 is an exploded perspective view showing the structure of the core according to the first embodiment.
Figure 3:
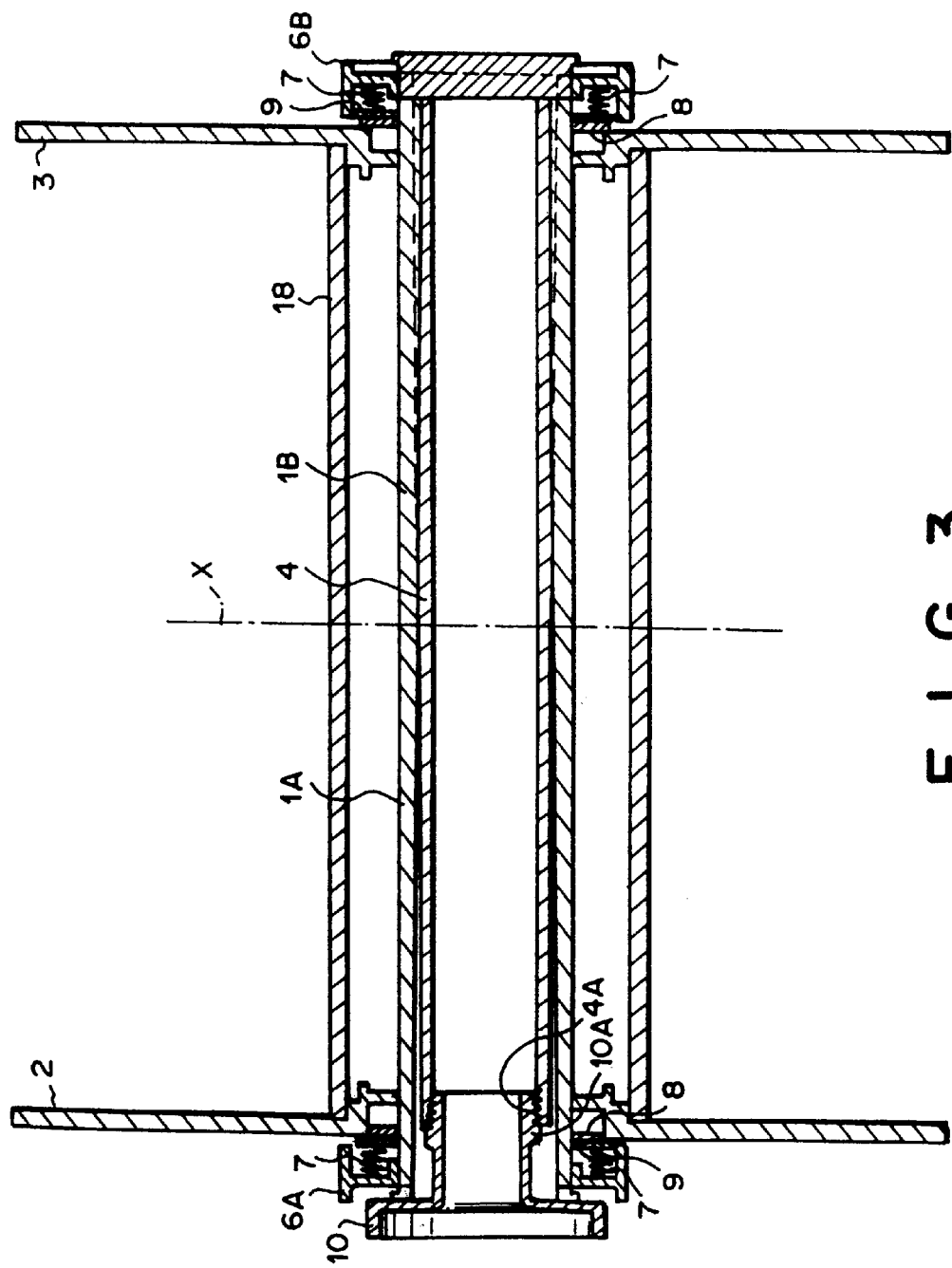
FIG. 3 is a sectional view taken along line I—I in FIG. 1.

FIG. 1 is a perspective view showing the structure of a core that is a first embodiment of the present invention. FIG. 2 is an exploded perspective view of the embodiment and FIG. 3 is a sectional view taken along line I—I in FIG. 1. As shown in FIG. 1, the core 20 of this embodiment comprises an inner core 1 and flange members 2, 3.

As shown in FIG. 2, the inner core 1 is divisible into two members 1A, 1B. The inner core member 1A is tubular and the inner core member 1B is composed of a tubular member having a tubular member 4 inserted therein. The length of the tubular member 4 is such as to extend to near the tip portion of the inner core member 1A when the inner core members 1A, 1B are joined. The inner core member 1A is formed with a projecting engagement portion 5A and the inner core member 1B is formed with a complementary recessed engagement portion 5B. When the inner core members 1A, 1B are joined, the engagement portion 5A fits into the engagement portion 5B to prevent the inner core members 1A, 1B from rotating relative to each other. Retainers 6A, 6B are rotatably attached to the opposite ends of the inner core 1 for retaining the core 20 on bearings of a paper magazine (explained later) when it is loaded therein. The retainers 6A, 6B are octagonal and the bearings of the paper magazine are of matching octagonal shape. The retainers 6A, 6B are therefore immobilized by the bearings and the inner core 1 is held in the paper magazine so that only it can rotate.

As shown in FIG. 3, flanges 8, 8 are attached to the opposite ends of the inner core 1. A friction member 9 made of felt or the like is adhered to one surface of each flange 8. Multiple springs 7 are inserted into spaces formed inside the retainers 6A, 6B. The retainers 6A, 6B are attached to the inner core 1 with the springs 7 pressing onto the friction members 9, 9 adhered to the flanges 8, 8. Hence a certain amount of frictional force is produced when the inner core 1 rotates relative to the retainers 6A, 6B. When the core 20 is loaded in the paper magazine, therefore, it will not rotate unless acted on by a certain amount of torque, whereby unnecessary rotation of the core 20 is prevented.

The inner wall at the tip of the tubular member 4 inserted into the inner core member 1B is formed with a female screw portion 4A. The inner core member 1A and the inner core member 1B are joined to constitute the inner core 1 by inserting the tubular member 4 into the inner core member 1A, inserting a screw member 10 formed with a male screw portion 10A from the end of the inner core member 1A attached with the retainer 6A and screwing the screw member 10 into the tubular member 4.

Figure 4:
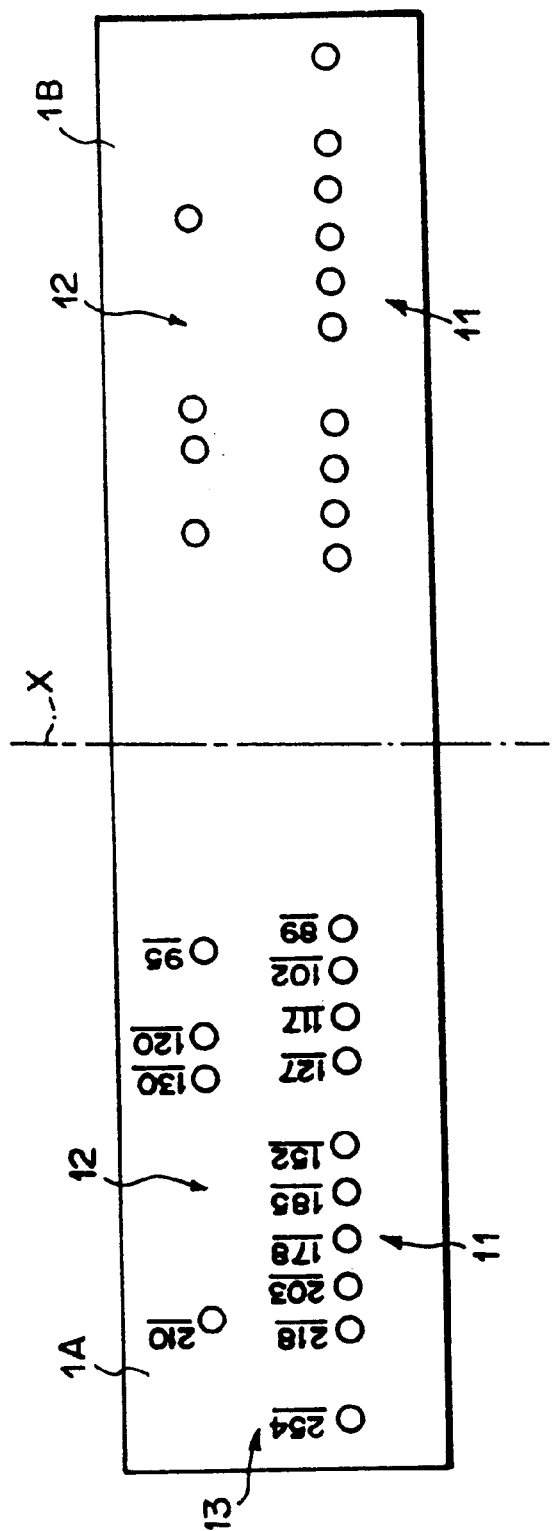
FIG. 4 is a diagram showing screw holes formed in an inner core.

The surfaces of the inner core members 1A, 1B of the inner core 1 are formed with paired rows of screw holes 11, 11 (see FIG. 4) and paired rows of screw holes 12, 12. The screw holes of each pair of rows are similarly spaced and are laterally symmetrical with respect to a line X bisecting the inner core 1 (see FIG. 3). As shown in FIG. 4, the screw holes of the rows 11, 12 are affixed with marks 13 indicating the sizes (widths) of different rolls of photosensitive material anticipated to be fitted on the inner core 1. The flange members 2, 3 are fixed at locations corresponding to the size of the roll of photosensitive material used by screwing screws 14, 14 into appropriate ones of the screw holes. By this, the spacing between the flange members 2, 3 fastened to the inner core 1 is made to conform with the size of the used photosensitive material. The screw holes of the rows 12 are formed at lateral positions where it would be impossible to form screw holes in the rows 11. For example, as can be seen in FIG. 4, it would be difficult to form a hole between the hole marked 89 (position of the flange member 2 for supporting a 89 mm roll) and the hole marked 102 (position of the flange member 2 for supporting a 102 mm roll) owing to the short distance between these two holes. The hole marked 95 for a 95 mm roll, i.e., for a roll of a size falling between 89 mm and 102 mm, is therefore formed in the separately established row 12. (The screw holes of the rows 11, 12 for positioning the other flange member (flange member 3) are, of course, similarly formed.)

Figure 5A:
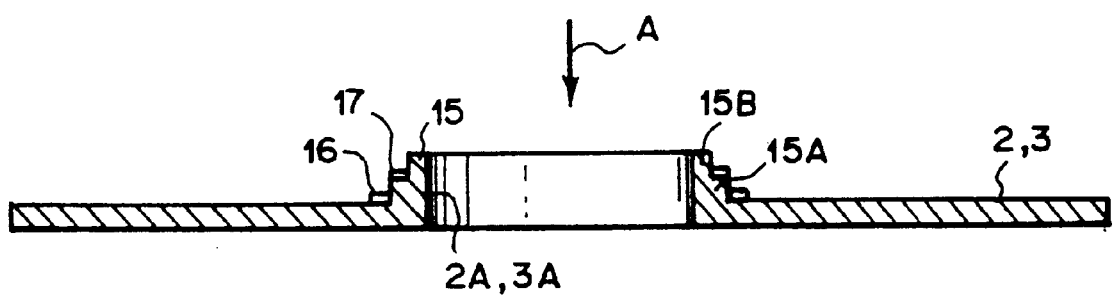
FIG. 5a is a sectional view showing the structural details of a flange member.
Figure 5B:
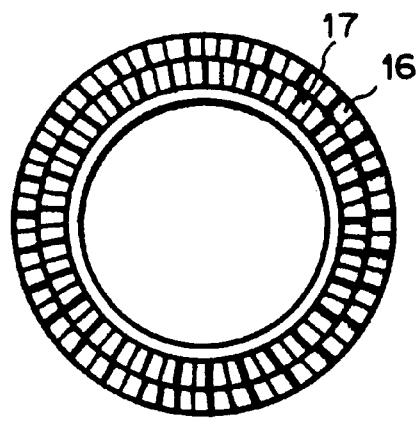
FIG. 5b is a partial plan view showing the central portion of the flange member.

FIG. 5 is a diagram showing the structural details of the flange member 2 (3). FIG. 5(a) is a sectional view taken through the center of the flange member and 5(b) is a view in the direction of the arrow A in 5(a). As shown in FIG. 5, the flange member 2 (3) is formed with a hole portion 2A (3A) for insertion of the inner core 1 and the end portion of the hole portion 2A (3A) is provided with cylindrical raised portions 15A, 15B formed step-like. The periphery of the insert portion 15 and the upper surface of the raised portion 15A are formed with wavy non-slip portions 16, 17. As shown in FIG. 3, the insert portion 15 is inserted into a paper tube 18 of the roll of photosensitive material. Since the insert portion 15 is formed with the raised portions 15A, 15B of differing diameter, paper tubes 18 of two different sizes can be supported. Specifically, when the flange members 2, 3 position a roll of photosensitive material with a large-diameter paper tube 18, the paper tube 18 fits over the large-diameter raised portion 15A and the end face of the paper tube 18 abuts on the non-slip portion 16. On the other hand, when a roll of photosensitive material with a small-diameter paper tube 18 is used, the paper tube 18 fits over the small-diameter raised portion 15B and its end face abuts on the non-slip portion 17. Therefore, when a roll of photosensitive material is restrained by the flange members 2, 3, movement of its paper tube 18 in the radial direction is restricted by the insert portion 15 and rotation of the paper tube 18 is restricted by the non-slip portion 16 or 17.

Figure 6:
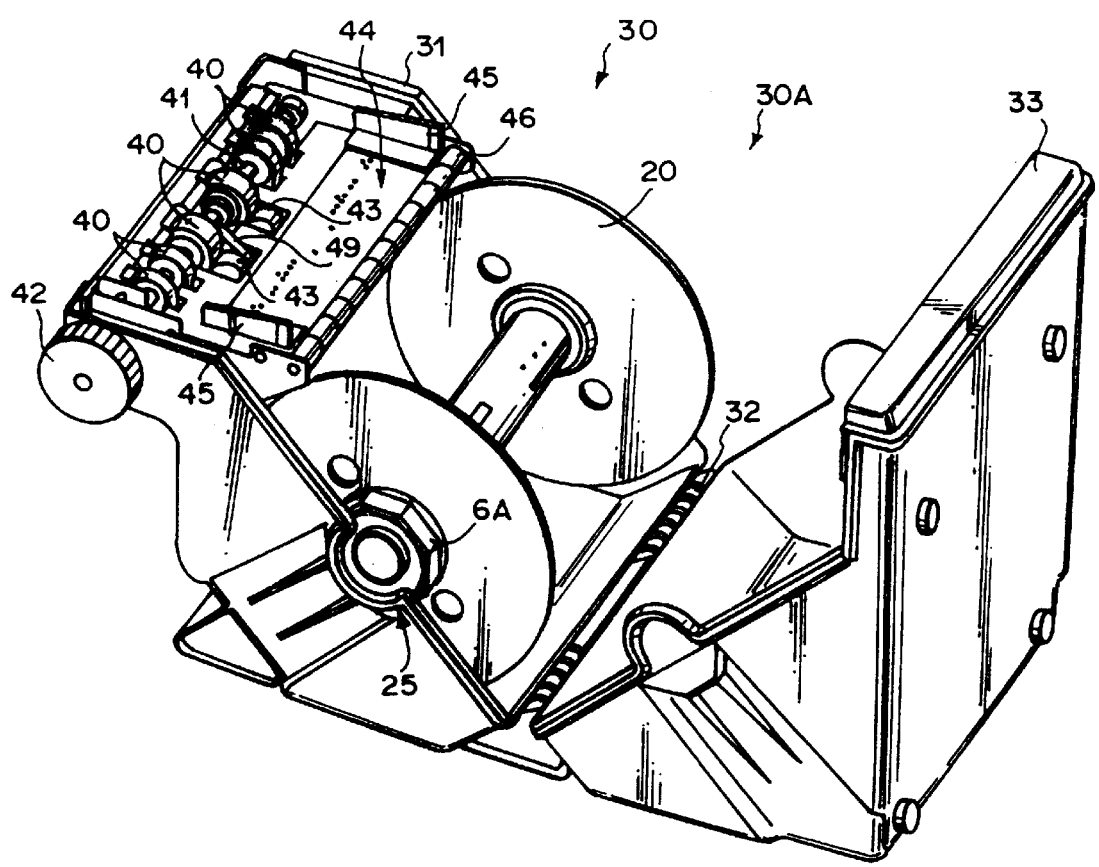
FIG. 6 is a perspective view of a paper magazine loaded with a core according to the first embodiment.

FIG. 6 is a perspective view showing the structure of a paper magazine with the core of this embodiment is loaded therein. FIG. 7 is a sectional view of the paper magazine taken perpendicular to the longitudinal axis of the core loaded therein. FIG. 8 is a perspective view showing the structure of a cover unit of the paper magazine. As shown in FIG. 6, the paper magazine 30 has a box-like magazine unit 31 into which a core 20 holding a roll of photosensitive material (not shown) can be loaded through an opening 30A. A cover unit 33 is attached to one end of the magazine unit 31 by a hinge 32. The cover unit 33 is rotated around the hinge 32 from the open states shown in FIG. 6 to cover the opening 30A in the closed state shown in FIG. 7. At the opposite end of the magazine unit 31 from the hinge 32 are rotatably supported drive rollers 40 for feeding the leading end portion of the photosensitive paper P out of the paper magazine 30. The drive rollers 40 are mounted on a rotary shaft 41 having a pulley 42 attached to its one end. The pulley 42 is driven to rotate by a drive belt wound about a drive pulley of a photographic printing apparatus (not shown) that uses the paper magazine 30. Free-rotating nip rollers 43 are installed upstream of the drive rollers 40 relative to the direction of photosensitive material conveyance and a guide section 44 for positionally restraining the lateral (widthwise) position of the photosensitive paper P is installed upstream of the rewind nip rollers 43. The guide section 44 is formed with multiple screw holes. Paired guides 45 are attached at screw holes whose positions conform with the width of the photosensitive paper P used, thereby matching the distance between the guides 45 to the photosensitive paper P. Guide rollers 46 for guiding the photosensitive paper P are installed upstream of the guide section 44.

As shown in FIGS. 7 and 8, a pair of nip rollers 47 and a pair of nip rollers 48 are rotatably supported on the cover unit 33 at positions opposing the drive rollers 40 so as to define the conveyance path of the photosensitive paper P. The nip rollers 47, 48 are urged toward the drive rollers 40 by springs (not shown).

A detection lever 49 is rotatably supported coaxially with the rewind nip rollers 43. The detection lever 49 can move between a position where it projects into the conveyance path of the photosensitive paper P and a position where it is retracted from the conveyance path. The detection lever 49 moves to the retracted position during conveyance of the photosensitive paper P and projects into the conveyance path when the photosensitive paper P is not present. It can therefore be detected when the photosensitive paper P has been used up by detecting projection of the detection lever 49 into the conveyance path.

The magazine unit 31 and the cover unit 33 are provided with bearings 25 for holding the retainers 6A, 6B of the core 20. The bearings 25 are octagonally configured to match the shape of the retainers 6A, 6B. When the core 20 is loaded in the paper magazine 30, the retainers 6A, 6B are therefore supported by the bearings 25 so as to be incapable of rotating.

After the core 20 holding the roll of photosensitive material has been loaded in the paper magazine 30, the photosensitive paper P is, as shown in FIG. 7, guided by the guide rollers 46, laterally guided by the guide section 44 and guided by the drive rollers 40, the rewind nip rollers 43 and the paired nip rollers 47, 48 to have its leading end fed to the outside of the paper magazine 30 through an outlet 26 formed in the paper magazine 30.

The method of using the core 20 according to the first embodiment and the operation of the paper magazine 30 will now be explained.

First, the inner core members 1A, 1B of the inner core 1 are separated in preparation for installing a roll of photosensitive material on the core 20. The flange members 2, 3 are fastened at the screw holes appropriate for the size of the photosensitive material to be used. The attachment of the flange members 2, 3 is carried out in a light room. Next, the inner core members 1A, 1B with the flange members 2, 3 attached, the screw member 10, the photosensitive material and the paper magazine 30 are taken into a darkroom. In the darkroom, the paper tube 18 is fitted on the inner core member 1B, the inner core member 1A is inserted into the paper tube 18 to engage the engagement portions 5A and 5B, and the male screw portion 10A of the screw member 10 is screwed into the female screw portion 4A to join the inner core members 1A, 1B. In this state, the roll of photosensitive material is securely retained on the core 20. The core 20 carrying the photosensitive material is loaded in the magazine unit 31 of the paper magazine 30 and the photosensitive paper P is drawn off the roll to the vicinity of the outlet 26 of the paper magazine 30. The cover unit 33 is then closed to complete the loading operation.

Thus, in this embodiment, the means for positioning the flange members 2, 3 on the inner core 1 are constituted by the screws 14, 14 and the rows of screw holes 11, 12. Proper positioning of photosensitive materials that differ in size by only one to a few millimeters is therefore possible because interference between closely laterally spaced screw holes can be avoided by staggering the screw holes in the circumferential direction of the inner core 1. As this enables a single inner core 1 to be used for mounting photosensitive material rolls of various sizes, it reduces the number of constituent components and lowers equipment cost.

Moreover, since the inner core 1 is constituted of two inner core members (1A, 1B), the flange members 2, 3 can be fastened at the screw holes whose locations are appropriate for the size of the photosensitive material, beforehand in a light room. The danger of fastening the flange members 2, 3 at wrong positions can therefore be eliminated. As this ensures that no gap will be present between the flange members 2, 3 and the end faces of the roll of photosensitive material, weaving of the photosensitive material can be prevented. Since the only operation that need be conducted in a darkroom is the joining of the inner core members 1A, 1B with the screw member 10, the installation of the roll of photosensitive material on the core 20 can be conducted with ease.

In addition, since each flange member 2 (3) is provided with an insert portion 15 constituted of the raised portions 15A, 15B having different diameters matched to different sized paper tubes 18, the raised portion 15A or 15B of the insert portion 15 matching the size of the paper tube 18 fits into the paper tube 18 when the roll of photosensitive material is installed on the core 20 according to the present invention, whereby the paper tube 18 is positionally restrained in the radial direction. As no need therefore arises for stocking inner cores 1 of different sizes matched to different sized paper tubes 18, the number of constituent components can be reduced and equipment cost lowered.

Owing to the provision of the non-slip portions 16, 17 at regions of the insert portions 15 abutted by end faces of the paper tube 18, moreover, unnecessary rotation of the roll of photosensitive material relative to the core 20 can be prevented.

Figure 9:
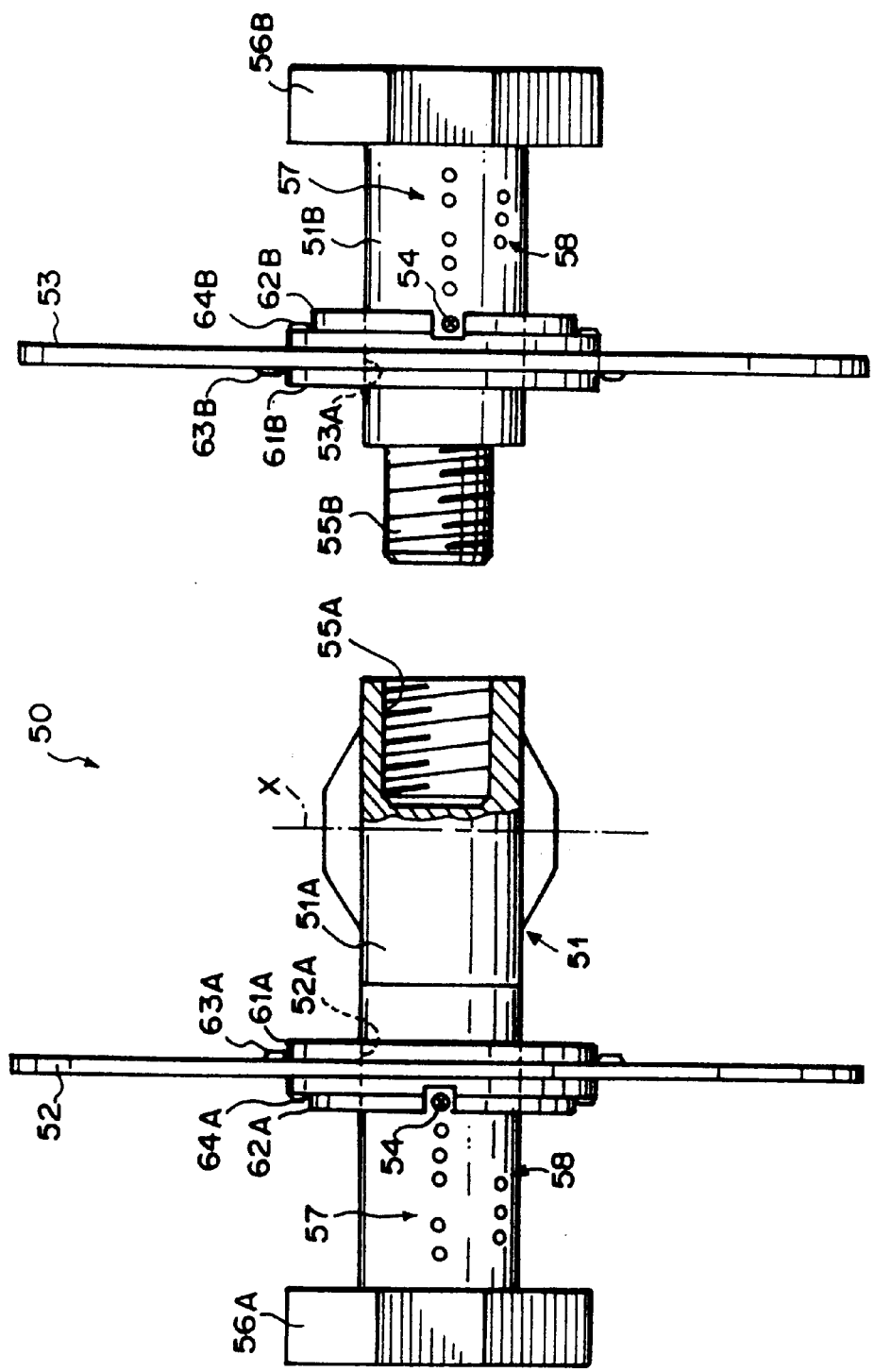
FIG. 9 is a diagram showing the structure of a core that is a second embodiment of the present invention.
Figure 10:
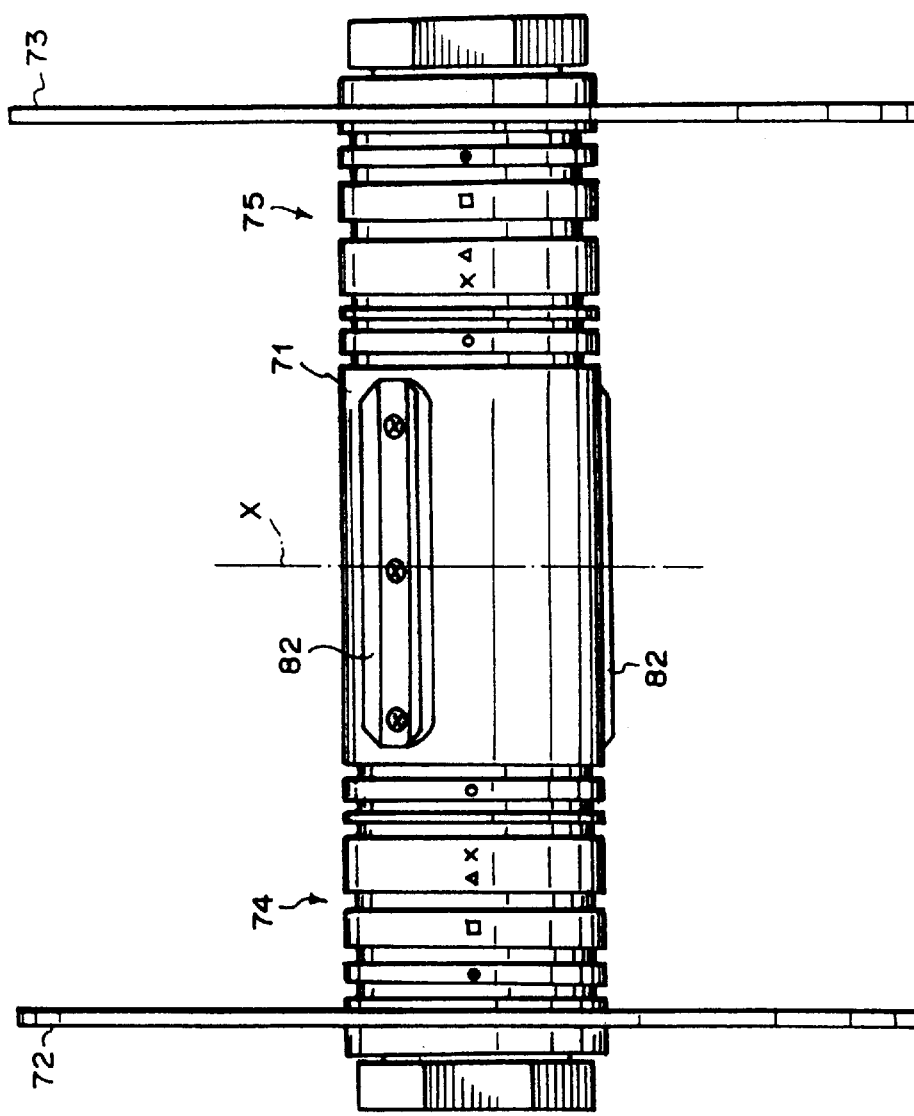
FIG. 10 is a diagram showing the structure of a conventional core.
Figure 11:
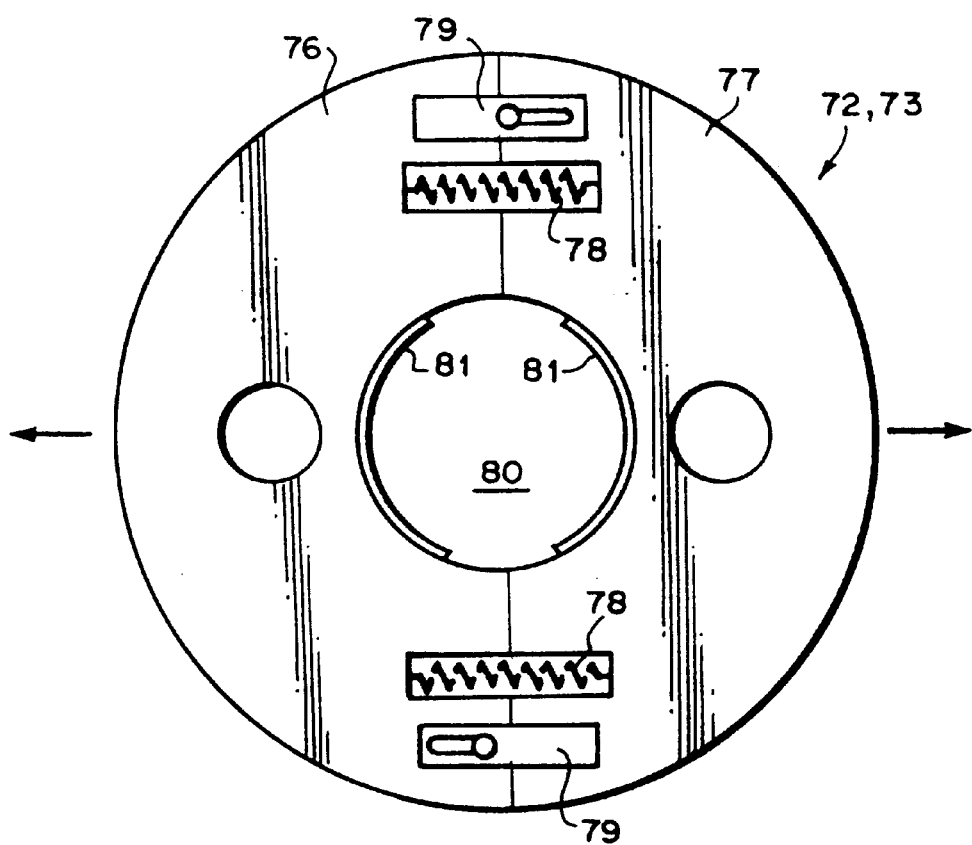
FIG. 11 is a diagram the structure of a flange member used in the conventional core.

A core that is a second embodiment of the invention will now be explained. FIG. 9 is a diagram showing the structure of a core 50 that is a second embodiment of the present invention. As shown in FIG. 9, the core 50 according to the second embodiment comprises an inner core 51 and a pair of flange members 52, 53. Retainers 56A, 56B are rotatably attached to the opposite ends of the inner core 51. The retainers 56A, 56B will not be explained in detail because they are configured identically to the retainers 6A, 6B of the first embodiment described earlier. The inner core 51 separates into an inner core member 51A and an inner core member 51B. The tip of the inner core member 51A is formed with a female screw portion 55A and the tip of the inner core member 51B is formed with a male screw portion 55B. The inner core members 51A, 51B can be joined by screwing the male screw portion 55B into the female screw portion 55A.

The surfaces of the inner core members 51A, 51B of the inner core 51 are formed with paired rows of screw holes 57, 57 and paired rows of screw holes 58, 58, each consisting of multiple screw holes formed at prescribed spacing. As in the case of the rows 11, 12 of the first embodiment, the screw holes of each pair of rows are similarly spaced and are laterally symmetrical with respect to a line X bisecting the inner core 1. The flange members 52, 53 are fixed at locations corresponding to the size of the roll of photosensitive material used by screwing screws 54, 54 into appropriate ones of the screw holes. By this, the spacing between the flange members 52, 53 fastened to the inner core 51 is made to conform with the size of the used photosensitive material. As in the first embodiment, the screw holes of the rows 58 are formed at lateral positions where it would be impossible to form screw holes in the rows 57.

Each flange member 52 (53) is formed with a hole portion 52A (53A) for insertion of the inner core 51. One side of the flange member 52 (53) is formed around the hole portion 52A (53A) with an insert portion 61A (61B) and the other side thereof is formed around the hole portion 52A (53A) with a step-like insert portion 62A (62B). Wavy non-slip portions 63A, 63B are formed around the insert portions 61A, 61B and wavy non-slip portions 64A, 64B are formed on the upper surfaces of the first steps of the insert portions 62A, 62B. Like the insert portions 15 of the first embodiment, the insert portions 61A, 61B, 62A and 62B are for insertion into the paper tube 18 of the roll of photosensitive material. Since the insert portions 61A, 61B differ in diameter from the insert portions 62A, 62B, paper tubes 18 of two different sizes can be supported by fastening the flange members 52, 53 to the inner core 51 with either the insert portions 61A, 61B or the insert portions 62A, 62B facing inward. Specifically, when a paper tube 18 of large diameter is used, the flange members 52, 53 are fastened to the inner core 51 with the insert portions 61A, 61B facing inward, and when a paper tube 18 of small diameter is used, they are fastened with the insert portions 62A, 62B facing inward. When the paper tube 18 has been installed with the insert portions 61A, 61B or the insert portions 62A, 62B inserted therein, the non-slip portions 63A, 63B or the non-slip portions 64A, 64B (depending on how the flange members 52, 53 are oriented) abut on the end faces of the paper tube 18. Therefore, when a roll of photosensitive material is restrained by the flange members 52, 53, movement of its paper tube 18 in the radial direction is restricted by the insert portions 61A, 61B or 62A, 62B and rotation of the paper tube 18 is restricted by the non-slip portions 63A, 63B or 64A, 64B.

The method of using the core 50 according to the second embodiment will now be explained.

First, the inner core members 51A, 51B of the inner core 51 are separated in preparation for installing a roll of photosensitive material on the core 50. The flange members 52, 53 are fastened at the screw holes appropriate for the size of the photosensitive material to be used. The attachment of the flange members 52, 53 is carried out in a light room. Next, the inner core members 51A, 51B with the flange members 52, 53 attached, the roll of photosensitive material and the paper magazine 30 are taken into a darkroom. In the darkroom, the paper tube 18 of the roll of photosensitive material is fitted on the inner core member 51A. The inner core member 51B is then inserted into the paper tube 18 and the male screw portion 55B is screwed into the female screw portion 55A to join the inner core members 51A, 51B. In this state, the roll of photosensitive material is securely retained on the core 50. The core 50 carrying the photosensitive material is loaded in the magazine unit 31 of the paper magazine 30, the photosensitive paper P is drawn off the roll, and the cover unit 33 is closed to complete the loading operation.

Thus, in this second embodiment, similarly to in the first, the means for positioning the flange members 52, 53 on the inner core 51 is constituted by the screws 54, 54 and the rows of screw holes 57, 58. Proper positioning of photosensitive materials that differ in size by only one to a few millimeters is therefore possible because interference between closely laterally spaced screw holes can be avoided by staggering the screw holes in the circumferential direction of the inner core 51. As this enables a single inner core 51 to be used for mounting photosensitive material rolls of various sizes, it reduces the number of constituent components and lowers equipment cost.

Moreover, since the inner core 51 is constituted of the two inner core members (51A, 51B), the flange members 52, 53 can be fastened at the screw holes whose locations are appropriate for the size of the photosensitive material, beforehand in a light room. The danger of fastening the flange members 52, 53 at wrong positions can therefore be eliminated. As this ensures that no gap will be present between the flange members 52, 53 and the end faces of the roll of photosensitive material, weaving of the photosensitive material can be prevented.

In addition, since each flange member 52 (53) is provided on opposite sides with insert portions 61A (61B) and step-like insert portion 62A (62B) having different diameters matched to different sized paper tubes 18, paper tubes 18 of two different sizes can be installed on the core 50 of the present invention by changing the directions in which the flange members 52, 53 face. As no need therefore arises for stocking inner cores 51 of different sizes matched to different sized paper tube 18, the number of constituent components can be reduced and equipment cost lowered.

Although the flange members are fastened to the inner core utilizing screw holes and screws in the foregoing embodiments, the invention is not limited to this arrangement and it is instead possible to attach the flange members to the inner core by means of holes and screws or holes and pins.

What is claimed is:

1. A paper magazine core for rotatably supporting a roll of photosensitive material in a paper magazine comprising:

an inner core for insertion into a paper tube wound with a roll of photosensitive material, a pair of flange members for positionally restraining a roll of photosensitive material installed on the inner core in its widthwise direction by abutting on opposite end faces of the roll of photosensitive material, and positioning sections for locating the flange members at positions on the inner core conforming with a width of the roll of photosensitive material, each flange member having insert portions for insertion into the paper tube, and the insert portions being formed step-like with raised first and second cylindrical portions, said first and said second cylindrical portions having different diameters and located on opposing end faces of said flange member, said diameters matched to paper tubes of different sizes.

2. A core according to claim 1, wherein portions of the insert portions abutting on an end face of the paper tube are formed with non-slip portions.

3. A core according to claim 1 or 2, wherein the inner core is divided longitudinally into multiple inner core members capable of attachment and detachment and the flange members are provided on different inner core members.

4. A paper magazine core for rotatably supporting a roll of photosensitive material in a paper magazine comprising:

an inner core for insertion into a paper tube wound with a roll of photosensitive material, a pair of flange members for positionally restraining a roll of photosensitive material installed on the inner core in its widthwise direction by abutting on opposite end faces of the roll of photosensitive material, and positioning sections for locating the flange members at positions on the inner core conforming with a width of the roll of photosensitive material, the inner core being divided longitudinally into multiple inner core members, said multiple inner core members of different diameters, and capable of attachment and detachment with one another, and the flange members are provided on different inner core members.

5. A paper magazine core for rotatably supporting a roll of photosensitive material in a paper magazine comprising:

an inner core for insertion into a paper tube wound with a roll of photosensitive material, said inner core divided longitudinally into multiple inner core members capable of attachment and detachment, wherein the multiple inner core members comprise a pair of inner core members, the first of said pair of inner core members being formed with a male connector and the second of said pair of inner core members formed with a female connector, so that said first and second inner core members can be joined together;

a pair of flange members for positionally restraining a roll of photosensitive material installed on the inner core in its widthwise direction by abutting on opposite end faces of the roll of photosensitive material, wherein the flange members are provided on different inner core members;

positioning sections for locating the flange members at positions on the inner core conforming with a width of the roll of photosensitive material, each of said positioning sections having multiple circular hole portions formed in a surface of the inner core at prescribed spacing conforming with widths of rolls of photosensitive materials of various types; and fastening portions engageable with the circular hole portions for fastening the flange members at predetermined positions.

* * * * *